United States Patent
Cho (10) Patent No.: US 10,163,022 B1
(45) Date of Patent: Dec. 25, 2018

(54) METHOD FOR LEARNING TEXT RECOGNITION, METHOD FOR RECOGNIZING TEXT USING THE SAME, AND APPARATUS FOR LEARNING TEXT RECOGNITION, APPARATUS FOR RECOGNIZING TEXT USING THE SAME

(71) Applicant: StradVision, Inc., Gyeongsangbuk-do (KR)

(72) Inventor: Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 15/630,188

(22) Filed: Jun. 22, 2017

(51) Int. Cl.
*G06K 9/72* (2006.01)
*G06N 99/00* (2010.01)
*G06K 9/18* (2006.01)
*G06F 17/21* (2006.01)

(52) U.S. Cl.
CPC ............... *G06K 9/18* (2013.01); *G06F 17/21* (2013.01); *G06K 9/72* (2013.01); *G06N 99/005* (2013.01)

(58) Field of Classification Search
CPC . G06K 9/18; G06K 9/72; G06F 17/21; G06N 99/005
See application file for complete search history.

(56) References Cited

U.S. PATENT DOCUMENTS

| | | | | |
|---|---|---|---|---|
| 7,308,451 B1* | 12/2007 | Lamping | ........... | G06F 17/30705 707/737 |
| 10,007,863 B1* | 6/2018 | Pereira | ................. | G06K 9/6215 |
| 2008/0005048 A1* | 1/2008 | Weng | ................... | G06K 9/4623 706/14 |
| 2008/0025610 A1* | 1/2008 | Abdulkader | ....... | G06K 9/00852 382/185 |

(Continued)

FOREIGN PATENT DOCUMENTS

CN        104809481      * 7/2015        .......... G06K 9/6227

OTHER PUBLICATIONS

Sung et al. "Scene text detection with robust character candidate extraction method." Document Analysis and Recognition (ICDAR), 2015 13th International Conference on. IEEE, 2015.*

(Continued)

*Primary Examiner* — Katrina Fujita
(74) *Attorney, Agent, or Firm* — Husch Blackwell LLP (57) ABSTRACT

A method for learning parameters used to recognize characters included in a text in a scene text image of training set is provided. The method includes steps of: (a) a training apparatus generating each feature vector corresponding to each of the segmented character images; (b) the training apparatus processing feature vectors $c_{i+j}$ of neighboring character images to thereby generate a support vector to be used for a recognition of a specific character image; (c) the training apparatus obtaining a merged vector by executing a computation with the support vector and a feature vector $c_i$ of the specific character image; and (d) the training appa- (Continued)

ratus (i) performing a classification of the specific character image as a letter included in a predetermined set of letters by referring to the merged vector; and (ii) adjusting the parameters by referring to a result of the classification.

18 Claims, 4 Drawing Sheets

(56) References Cited

U.S. PATENT DOCUMENTS

| | | | | |
|---|---|---|---|---|
| 2011/0007366 | A1* | 1/2011 | Sarkar | G06K 9/00456 358/462 |
| 2011/0007970 | A1* | 1/2011 | Saund | G06K 9/00449 382/176 |
| 2015/0063688 | A1* | 3/2015 | Bhardwaj | G06K 9/18 382/159 |
| 2015/0347859 | A1* | 12/2015 | Dixon | G06K 9/186 382/138 |
| 2015/0347860 | A1* | 12/2015 | Meier | G06K 9/72 382/140 |
| 2015/0347861 | A1* | 12/2015 | Doepke | H04N 5/23245 382/199 |
| 2017/0140240 | A1* | 5/2017 | Socher | G06N 3/0445 |
| 2017/0293638 | A1* | 10/2017 | He | G06F 17/30253 |
| 2018/0024968 | A1* | 1/2018 | Clinchant | G06N 3/0454 706/12 |
| 2018/0137349 | A1* | 5/2018 | Such | G06K 9/6273 |

OTHER PUBLICATIONS

Jaderberg et al. "Deep structured output learning for unconstrained text recognition." arXiv preprint arXiv:1412.5903 (2014).*
Jaderberg et al. "Synthetic data and artificial neural networks for natural scene text recognition." arXiv preprint arXiv:1406.2227 (2014).*
Krishnan et al. "Deep feature embedding for accurate recognition and retrieval of handwritten text." Frontiers in Handwriting Recognition (ICFHR), 2016 15th International Conference on. IEEE, 2016.*
Poznanski et al. "Cnn-n-gram for handwriting word recognition." Proceedings of the IEEE Conference on Computer Vision and Pattern Recognition. 2016.*
Sakaguchi et al. "Robsut Wrod Reocginiton via Semi-Character Recurrent Neural Network." AAAI. Feb. 2017.*
Petroski Such, Felipe. "Deep Learning Architectures for Novel Problems." Feb. 2017.*

* cited by examiner

METHOD FOR LEARNING TEXT RECOGNITION, METHOD FOR RECOGNIZING TEXT USING THE SAME, AND APPARATUS FOR LEARNING TEXT RECOGNITION, APPARATUS FOR RECOGNIZING TEXT USING THE SAME

FIELD OF THE INVENTION

The present invention relates to a method, and an apparatus for learning one or more parameters used to recognize one or more characters included in a text in a scene text image of training set, and more particularly, to the method and the apparatus for performing processes of (1) generating or allowing other device to generate each feature vector corresponding to each of segmented character images, if the segmented character images are acquired by dividing an image of the text into separate images of the characters; (2) processing or allowing other device to process feature vectors $c_{i+j}$ of neighboring character images to thereby generate a support vector to be used for recognizing a specific character image, on the condition that the specific character image and the neighboring character images are included in the segmented character images, wherein index j is not equal to 0 and $-m \leq j \leq n$; (3) obtaining or allowing other device to obtain a merged vector or its processed value by executing a computation with the support vector and a feature vector $c_i$ of the specific character image; and (4)(i) performing or allowing other device to perform a classification of the specific character image as a letter included in a predetermined set of letters by referring to the merged vector or its processed value; and (ii) adjusting or allowing other device to adjust the parameters by referring to a result of the classification; and a method and an apparatus using the same for recognizing one or more characters for testing included in a text for testing in a scene text image of testing set.

BACKGROUND OF THE INVENTION

Today, a variety of algorithms for text detection and text recognition have been devised and applied to various fields of application. The technologies for detecting or recognizing texts in natural images have gained a lot of attentions in recent years as a key component for reading texts in those natural images, and related patent applications have been filed as well.

With images of training set and training algorithms devised, the technologies trains an apparatus, and then the trained apparatus applies various text recognition algorithms to identify texts.

Given a natural image as an input, a technology for detecting texts may find out a position and a size of each text in the natural image and a technology for recognizing texts may identify a set of characters located at the position. A text in an image could be detected by a device itself like ADAS, i.e., advanced driver-assistance systems, or inputted by a user through a touch interface. Thus, the technology for detecting texts may be implemented more easily than the technology for recognizing texts.

Figure 1A:
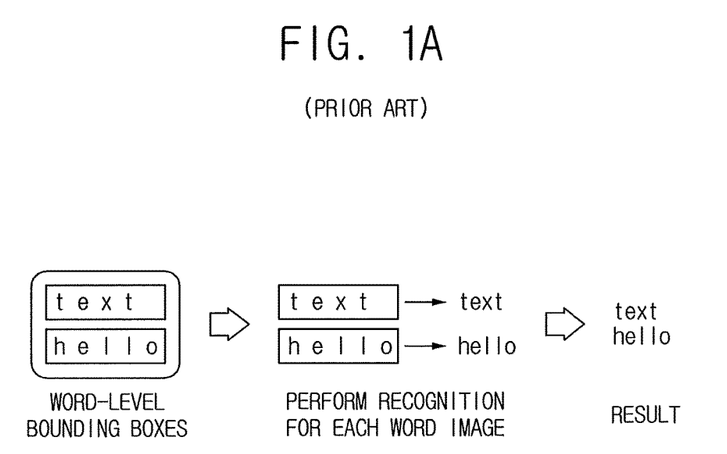
FIG. 1A is a drawing schematically illustrating a conventional word-level processing method for recognizing texts.
Figure 1B:
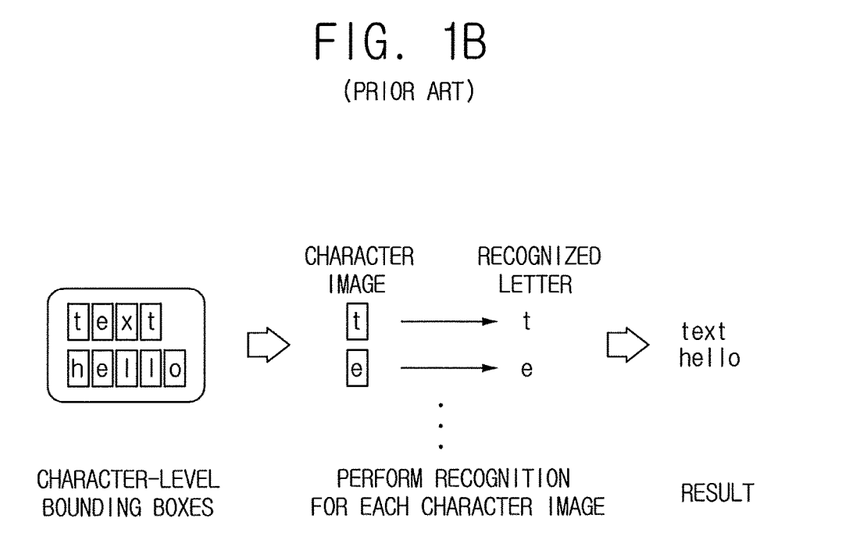
FIG. 1B is a drawing schematically illustrating another conventional character-level processing method for recognizing texts.

The conventional text recognition methods may be categorized into two types. FIGS. 1A and 1B are respective drawings illustrating each type of the methods.

FIG. 1A is a drawing illustrating a method of segmenting an input image by each of words in the input image and holistically recognizing each of the words in each of corresponding word-level bounding boxes. And, FIG. 1B is a drawing illustrating a method of segmenting an input image by each of characters in the input image, recognizing each of the characters in each of corresponding character-level bounding boxes and combining the recognized characters to determine an appropriate word with a certain meaning.

However, the conventional word-level processing method such as FIG. 1A may be vulnerable to variations in text length, variations in spacing between characters, and languages such as Chinese or Japanese that have no spaces in its text. And the conventional character-level processing method such as FIG. 1B may suffer from ambiguity between similar-shaped characters, e.g., {I,1,l}, {0,O}, {5,S}.

As such, all the conventional text recognition approaches have such drawbacks as mentioned above. Thus, the applicant comes up to the invention of a robust and novel scene text recognition method. Particularly, a novel text recognition method with a high efficiency in identifying characters with similar shape is devised by reflecting a numerical value, which is determined by referring to feature information of at least one or more of neighboring characters adjacent to a specific character as a subject to be identified, in a numerical value of feature of the specific character.

SUMMARY OF THE INVENTION

It is an object of the present invention to solve all the problems mentioned above.

It is another object of the present invention to provide a text recognition method with a high efficiency in identifying similar-shaped characters by performing operations on a feature vector of a specific character as a subject to be identified with a feature vector determined by referring to feature information of at least one or more of neighboring characters adjacent to the specific character.

In accordance with one aspect of the present invention, there is provided a method for learning one or more parameters used to recognize one or more characters included in a text in a scene text image of training set, including steps of: (a) a training apparatus, if segmented character images are acquired by dividing an image of the text into separate images of the characters, generating or allowing other device to generate each feature vector corresponding to each of the segmented character images; (b) the training apparatus, on the condition that a specific character image and its neighboring character images are included in the segmented character images, processing or allowing other device to process feature vectors ci+j of at least part of the neighboring character images by executing at least one of computations to thereby generate a support vector to be used for a recognition of the specific character image, wherein index j is not equal to 0 and $-m \leq j \leq n$; (c) the training apparatus obtaining or allowing other device to obtain a merged vector or its processed value by executing a computation with the support vector and a feature vector ci of the specific character image; and (d) the training apparatus (i) performing or allowing other device to perform a classification of the specific character image as a letter included in a predetermined set of letters by referring to the merged vector or its processed value; and (ii) adjusting or allowing other device to adjust the parameters by referring to a result of the classification.

In accordance with another aspect of the present invention, there is provided a method for recognizing one or more characters for testing included in a text for testing in a scene text image of testing set, including steps of: (a) a testing apparatus generating or allowing other device to generate each feature vector for testing corresponding to each of segmented character images for testing if the segmented character images are acquired by dividing an image of the text for testing into separate images of the characters for testing, on the condition that (i) a first process of generating each feature vector for training corresponding to each of segmented character images for training if the segmented character images for training are acquired by dividing an image of a text for training into separate images of characters included in the text for training; (ii) a second process of processing feature vectors ci+j for training of at least part of neighboring character images for training by executing at least one of computations to thereby generate a support vector for training to be used for recognizing a specific character image for training, wherein the specific character image for training and its neighboring character images for training are included in the segmented character images for training and wherein index j is not equal to 0 and $-m \leq j \leq n$; (iii) a third process of obtaining a merged vector for training of the specific character image for training or its processed value by executing a computation with the support vector for training and a feature vector ci for training of the specific character image for training; and (iv) a fourth process of performing a classification of the specific character image for training as a letter included in a predetermined set of letters by referring to the merged vector for training or its processed value, and adjusting one or more parameters by referring to a result of the classification have been executed; (b) the testing apparatus, on the condition that a specific character image for testing and its neighboring character images are included in the segmented character images for testing, processing or allowing other device to process feature vectors $c_{i+j}$ for testing of at least part of the neighboring character images for testing by executing at least one of computations to thereby generate a support vector for testing to be used for recognizing the specific character image for testing, wherein index j is not equal to 0 and $-m \leq j \leq n$; (c) the testing apparatus obtaining or allowing other device to obtain a merged vector for testing or its processed value by executing a computation with the support vector for testing and a feature vector ci for testing of the specific character image for testing; and (d) the testing apparatus performing a classification or allowing other device to perform a classification of the specific character image for testing as a letter included in a predetermined set of letters by referring to the merged vector for testing or its processed value.

In accordance with still another aspect of the present invention, there is provided a training apparatus for learning one or more parameters used to recognize one or more characters included in a text in a scene text image of training set, including: a communication part for acquiring (i) segmented character images obtained by dividing an image of the text in the scene text image into separate images of the characters, (ii) the image of the text or (iii) the scene text image; and a processor for performing processes of (i) generating or allowing other device to generate each feature vector corresponding to each of the segmented character images, (ii) generating or allowing other device to generate a support vector to be used for recognizing a specific character image by executing at least one of computations with feature vectors $c_{i+j}$ of one or more neighboring character images, wherein the specific character image and the neighboring character images are included in the segmented character images, and wherein index j is not equal to 0 and $-m \leq j \leq n$; (iii) obtaining or allowing other device to obtain a merged vector or its processed value by executing a computation with the support vector and a feature vector ci of the specific character image; and (iv)(iv-1) classifying or allowing other device to classify the specific character image as a letter included in a predetermined set of letters by referring to the merged vector or its processed value, and (iv-2) adjusting or allowing other device to adjust the parameters by referring to a result of the classification.

In accordance with still yet another aspect of the present invention, there is provided a testing apparatus for recognizing one or more characters for testing included in a text for testing in a scene text image of testing set, including: a communication part for acquiring (i) segmented character images for testing obtained by dividing an image of the text for testing in the scene text image into separate images of the characters for testing, (ii) the image of the text for testing or (iii) the scene text image, on the condition that (1) a first process of generating each feature vector for training corresponding to each of segmented character images for training if the segmented character images for training are acquired by dividing an image of a text for training into separate images of characters included in the text for training; (2) a second process of generating a support vector for training to be used for recognizing a specific character image for training by executing at least one of computations with feature vectors ci+j for training of one or more neighboring character images for training, wherein the specific character image for training and the neighboring character images for training are included in the segmented character images for training, and wherein index j is not equal to 0 and $-m \leq j \leq n$; (3) a third process of obtaining a merged vector for training of the specific character image for training or its processed value by executing a computation with the support vector for training and a feature vector ci for training of the specific character image for training; and (4) a fourth process of classifying the specific character image for training as a letter included in a predetermined set of letters by referring to the merged vector for training or its processed value, and adjusting one or more parameters by referring to a result of the classification have been executed; and a processor for performing processes of (i) generating or allowing other device to generate each feature vector for testing corresponding to each of the segmented character images for testing; (ii) generating or allowing other device to generate a support vector for testing to be used for recognizing a specific character image for testing by executing at least one of computations with feature vectors ci+j for testing of one or more neighboring character images for testing, wherein the specific character image for testing and the neighboring character images for testing are included in the segmented character images for testing, and wherein index j is not equal to 0 and $-m \leq j \leq n$; (iii) obtaining or allowing other device to obtain a merged vector for testing or its processed value by executing a computation with the support vector for testing and a feature vector ci for testing of the specific character image for testing; and (iv) classifying or allow other device to classify the specific character image for testing as a letter included in a predetermined set of letters by referring to the merged vector for testing or its processed value.

BRIEF DESCRIPTION OF THE DRAWINGS

The above and other objects of the present invention will become apparent from the following description of preferred embodiments given in conjunction with the accompanying drawings, in which.

DETAILED DESCRIPTION OF THE PREFERRED EMBODIMENTS

To make purposes, technical solutions, and advantages of the present invention clear, reference is made to the accompanying drawings that show, by way of illustration, more detailed example embodiments in which the invention may be practiced. These embodiments are described in sufficient detail to enable those skilled in the art to practice the invention.

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
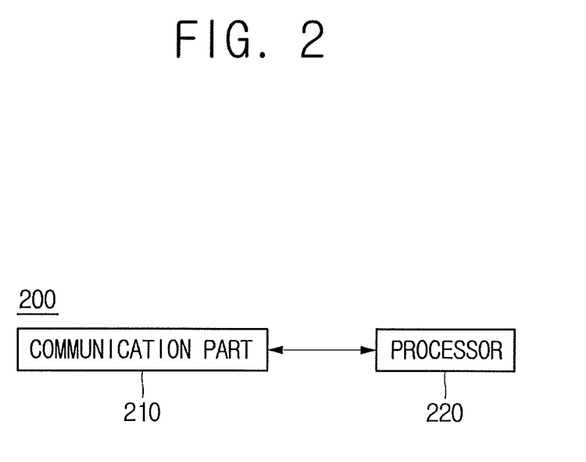
FIG. 2 is a block diagram showing a configuration of a training apparatus for recognizing texts in a scene text image in accordance with one example embodiment of the present invention.

FIG. 2 is a block diagram showing a configuration of a training apparatus for recognizing texts in a scene text image in accordance with one example embodiment of the present invention.

Referring to FIG. 2, a training apparatus 200 for recognizing texts in a scene text image includes a communication unit 210 and a processor 220.

The communication unit 210 may be configured to communicate with external devices. Particularly, the communication unit 210 may be configured to receive a scene text image of training set, in which texts as subjects to be recognized are included. The processor 220 described below may be configured to detect and extract a text including characters in the scene text image. As another example, the processor 220 may be configured to segment an image of the text into a set of images of the characters, thereby acquiring segmented character images. As still another example, the present invention does not exclude a case in which the communication unit 210 is configured to receive the image of the text or to receive the segmented character images which are obtained by dividing the image of the text into separate images of the characters.

For reference, a method for generating the segmented character images is described below. Given a scene text image, after a text including characters is extracted from the scene text image, a synthetic data generator based on an image degradation model or an equivalent component may divide an image of the extracted text into separate images of the characters, i.e., the segmented character images. Certainly, it is not limited thereto. Generally, the segmented character images are normalized images to be used for calculating feature vectors thereof.

The processor 220 may perform a process of calculating or allowing other device to calculate each feature vector corresponding to each of the segmented character images if the segmented character images are acquired.

Herein, a meaning of "calculating each feature vector corresponding to each of the segmented character image" may represent that feature information of each character in the segmented character image is expressed as multi-dimensional values. That is, one or more embedding functions may apply operations to each one of the segmented character images to map the feature of the character into the multi-dimensional numeric representation. Also, said features may not only include classic features derived from Haar, HOG (Histogram of Oriented Gradients), or LBP (Local Binary Pattern) but also include features acquired from CNN (convolutional neural network).

Figure 3:
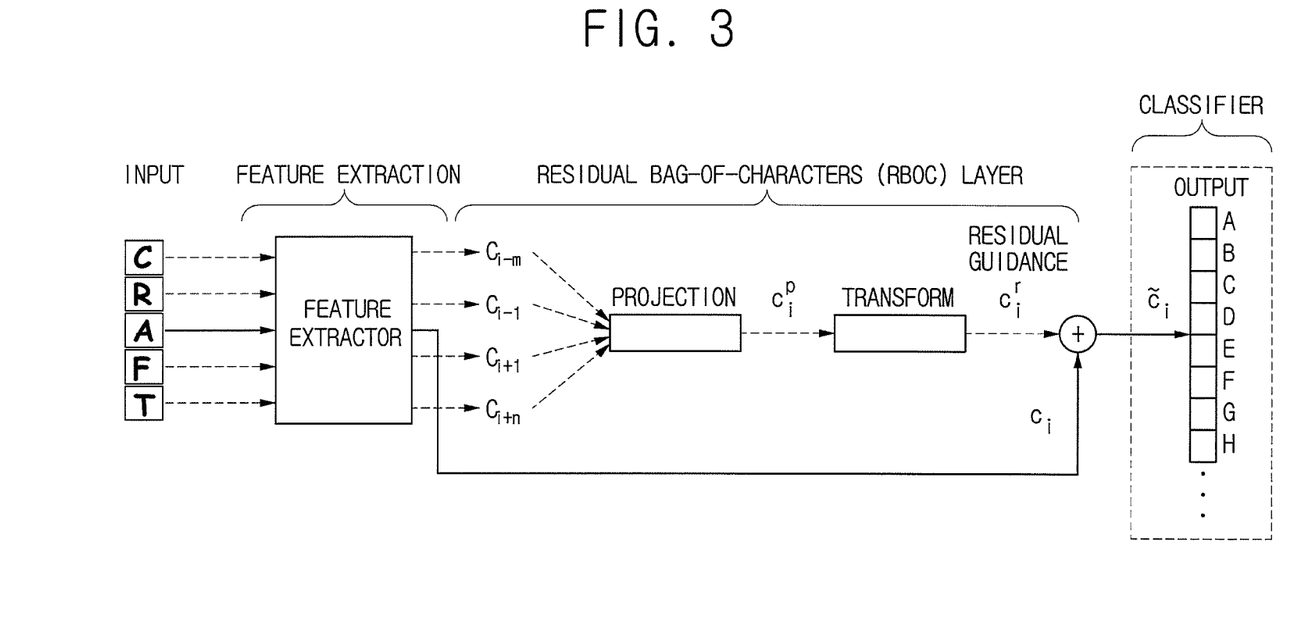
FIG. 3 is a drawing illustrating a method for training an apparatus to recognize a text in an image of training set by learning syntactic relationships between characters in the text in accordance with one example embodiment of the present invention.

The processor 220 may perform a process of acquiring or allowing other device to acquire a support vector, i.e., a residual guidance as shown in FIG. 3, to be used subsidiarily to recognize a specific character image, by executing at least one of computations with feature vectors $c_{i+j}$ of one or more neighboring character images. Herein, the specific character image and its neighboring character images are included in the segmented character images. Further, index j is not equal to 0 and $-m \leq j \leq n$.

Herein, the specific character image may refer to a character image as a subject to be recognized among the segmented character images. The neighboring character images may refer to character images adjacent to the specific character image within a predetermined distance among the segmented character images. For example, the neighboring character images are determined as character images within the same distance to both sides of the specific character, character images within a certain distance to the forward side thereof, or character images within a certain distance to the backward side thereof.

Moreover, a value of the variable index j stands for the context window size and determines the number of the adjacent character images to be utilized by the computations. Besides, the term "context" represents the syntactic relationships between the specific character and its neighboring characters, and the term "residual guidance" represents a vector whose elements are expressed by using information on the context.

In accordance with one example embodiment of the present invention, the computations may include a projection operation for acquiring a projected vector by utilizing the feature vectors $c_{i+j}$ of at least part of the neighboring character images, and a transformation operation for acquiring the support vector, i.e., the residual guidance, by applying at least one of a normalization process or a scale process.

For example, in accordance with one example embodiment of the present invention, the projection operation includes an operation of multiplying each corresponding weighted value to elements in each of the feature vectors $c_{i+j}$ and an operation of averaging the elements element-wisely across the feature vectors $c_{i+j}$.

Herein, the weighted value mentioned above may be set differently for each of the feature vectors $c_{i+j}$ of the neighboring images involved in the operation. In this case, the weighted value may be set to be higher as a distance value between a location of a certain neighboring character image selected from the neighboring character images and that of the specific character image becomes smaller. Contrarily, the weighted value may be set to be equal for each of the feature vectors $c_{i+j}$ of the neighboring images involved in setting the weighted value.

The processor 220 may perform a process of obtaining or allowing other device to obtain a merged vector or its processed value by executing a computation with the support vector and a feature vector $c_i$ of the specific character image.

For example, the merged vector may be obtained by adding the support vector and the feature vector $c_i$ of the specific character and it is served as an input of a classifier for determining an identity of the specific character. As a reference, the number of character classes depends on the recognition target language. For example, the number of classes is either 26 (case-insensitive) or 52 (case-sensitive) for English and it is 10 for digital numbers.

Additionally, the processor 220 may perform a process of classifying or allowing other device to classify the specific character image as a letter in a predetermined set of letters by referring to the merged vector or its processed value.

Finally, the processor 220 may perform a process of adjusting or allowing other device to adjust trainable parameters by referring to a result of the classification. To be more specific, the parameters are adjusted by performing a back-propagation training technique. That is, as part of the training process, if the letter predicted by the classifier for the specific character image is different from the known desired letter, i.e. ground truth output, for the specific character image, the classifier will adjust its parameters to reduce error by referring to difference information acquired by comparing the result of the classification to the ground truth output.

FIG. 3 is a drawing illustrating the method for training the apparatus to recognize a text in an image of the training set by learning syntactic relationships between characters in the text in accordance with one example embodiment of the present invention.

Referring to FIG. 3, the method with a high efficiency in identifying characters with similar shape is provided.

Specifically, referring to FIG. 3, the apparatus may be comprised of the following three parts, i.e., a feature extraction layer, an RBOC (residual bag-of-character) layer and a classifier. In detail, the feature extraction layer may acquire respective images of characters, extract features from the respective images of the characters and output information on the features as multi-dimensional vectors, i.e., feature vectors. The RBOC layer may execute operations to acquire the support vector, i.e. residual guidance, by utilizing feature vectors of at least part of the characters excluding the specific character as a subject to be identified and then an operation of adding the residual guidance and the feature vector of the specific character to thereby output the merged vector. And, the classifier may output a predicted letter as a result of the classification determined by referring to the merged vector.

In accordance with one example embodiment of the present invention, the feature extraction layer may be implemented by convolutional neural network (CNN). In detail, CNN parameters that generate the ground truth output are learned from given training data set and the learned CNN parameters may be applied to character images.

For example, the CNN may be configured to include five convolutional sublayers, where each layer may include five components. The five components may be in the order of ordinary 2D convolution, exponential linear unit(ELU), 1D convolution, rectified linear unit(ReLU), and batch normalization(BN). The ELU component has been placed between two convolutions to alleviate the vanishing gradient problem. Character images are normalized and quantified as vectors before being fed to the first CNN sublayer, and the subsequent CNN sublayers may take an operation result of the previous CNN sublayer as their input.

The detailed configuration of the CNN in accordance with the present invention is summarized and provided in the following Table 1. As it could be seen from the Table 1 below, the CNN uses a small number of layers and channels, which is efficient in terms of computations and a model size.

TABLE 1

| | CNN configuration. | |
|---|---|---|
| Index | Type | Configurations |
| 5 | Batch norm. | m = 0.9 |
| | Convolution | k = 1, c = 128, s = 1, p = 0, ReLU |
| | Convolution | k = 3, c = 128, s = 2, p = 1, ELU |
| 4 | Batch norm. | m = 0.9 |
| | Convolution | k = 1, c = 64, s = 1, p = 0, ReLU |
| | Convolution | k = 3, c = 64, s = 2, p = 1, ELU |
| 3 | Batch norm. | m = 0.9 |
| | Convolution | k = 1, c = 32, s = 1, p = 0, ReLU |
| | Convolution | k = 3, c = 32, s = 2, p = 1, ELU |
| 2 | Batch norm. | m = 0.9 |
| | Convolution | k = 1, c = 16, s = 1, p = 0, ReLU |
| | Convolution | k = 3, c = 16, s = 2, p = 1, ELU |
| 1 | Batch norm. | m = 0.9 |
| | Convolution | k = 1, c = 8, s = 1, p = 0, ReLU |
| | Convolution | k = 3, c = 8, s = 2, p = 1, ELU |
| | Image | 32X32X1 | k: kernel size, c: channel, s: stride, p: padding size, m: momentum factor

In detail, the RBOC layer may generate residual guidance and add the residual guidance and the feature vector of the specific character. Herein, the residual guidance that represents syntactic and semantic relationships between characters may be acquired through several computations. In accordance with one example embodiment of the present invention, the computations may include a projection operation and a transformation operation.

For example, the projection operation may be implemented by 1D convolution with a filter size of 2k+1, where variable k refers to a context window size. As an example, if k is set to 2, the convolution kernel for the projection operation may be set to [0.25, 0.25, 0, 0.25, 0.25], where weight for the specific character is 0. In this case, the 1D convolution operation to which the convolution kernel is applied may represent an average operation on feature vectors of the four neighboring character images adjacent to the specific character.

Meanwhile, the transformation operation may be a fully-connected layer or 1×1 convolution. Herein, the fully-connected layer may be implemented as an inner product layer capable of performing an operation of multiplying a weight matrix W and an operation of adding bias B. As one example, a size of the weight matrix W may be 128×128 and that of the bias B may be 1×128.

The residual guidance may be acquired by applying both the projection operation and the transformation operation, or by applying the projection operation only.

After the residual guidance being acquired, executing an add operation of the residual guidance $c_i''$ and the feature vector ci of the specific character may generate the ultimately computed feature vector $c_i$(tilt) of the specific character to be identified.

The classifier may be implemented by conventional Support Vector Machine (SVM), or it may be implemented as a linear classifier, but it is not limited thereto. For example, if the classifier is implemented by the linear classifier, a weight and a bias of the linear classifier are learned by using training data set. For example, the linear classifier may receive $c_i$(tilt) as input and outputs a predicted letter A for the specific character image as a result of the classification.

The method of FIG. 3 is an end-to-end fashion supervised learning. Optimal values of the parameters for precise recognition of the texts may be learned via the method.

Meanwhile, the processor 220 performs a function of controlling data flow between the communication part 210 as described above and other components. In short, the processor 220 controls individual unique functions in the communication part 210 and other components by controlling data flow among the components of the training apparatus 200 for recognizing texts.

The processor 220 may include hardware features such as micro processing unit (MPU), central processing unit (CPU), cache memory, and data bus. Moreover, it may further include software features such as an operating system and applications that perform certain purposes.

Hereinafter, a configuration and corresponding functions of a testing apparatus, which is not shown, for recognizing texts in a scene text image of testing set will be described. The testing apparatus adopts the parameters learned through the method illustrated in FIG. 3 to recognize the texts in the testing images. The testing apparatus may be the same apparatus as the training apparatus aforementioned or it may be a different one. The duplicated description with the training apparatus set forth above may be omitted.

The testing apparatus (not shown) in accordance with another example embodiment of the present invention may also include a communication unit and a processor.

The communication unit may be configured to communicate with external devices. Particularly, the communication unit may be configured to receive a scene text image of testing set, in which a text for recognition is included. The processor described below may be configured to detect and extract characters for recognition which are included in the text in the scene text image. As another example, the processor may be configured to segment an image of the text for recognition into a set of images of the characters for recognition, i.e. segmented character images. Certainly, the present invention does not exclude the cases in which the communication unit is configured to receive the image of the text for recognition or to receive the segmented character images. Herein, the text for recognition in a scene text image of testing set will be referred as "the text for testing", and the characters for recognition in such a text will be referred as "the characters for testing". And the segmentation of an image of the text for testing into separate images of the characters for testing will be referred as "segmented character images for testing".

The processor may perform a process of acquiring or allowing other device to acquire each feature vector for testing corresponding to each of the segmented character images for testing if the segmented character images for testing are acquired. Herein, each feature vector for testing may be referred to each feature vector for each character image included in the segmented character images for testing.

The processor may perform a process of generating or allowing other device to generate a support vector for testing, i.e. residual guidance for testing, to be used subsidiarily to recognize a specific character image for testing by executing at least one of computations with feature vectors $c_{i+j}$ for testing of one or more neighboring character images for testing. Herein, the specific character image for testing and the neighboring character images for testing are included in the segmented character images for testing and that index j is not equal to 0 and $-m \leq j \leq n$.

Furthermore, the processor may perform a process of obtaining or allowing other device to obtain a merged vector for testing or its processed value by executing a computation with the support vector for testing and a feature vector ci for testing of the specific character image for testing.

Additionally, the processor may perform a process of classifying or allow other device to classify the specific character image for testing as a letter included in the predetermined set of letters by referring to the merged vector for testing or its processed value.

As a reference, the training apparatus aforementioned may adjust parameters by performing a backpropagation training technique while the testing apparatus may not perform this process.

The present invention has following effects:

The present invention has an effect of providing a text recognition method with a high efficiency in identifying similar shaped characters by performing the operation of adding the feature vector of the specific character as a subject to be identified and the residual guidance determined by referring to feature information of at least one or more of the neighboring characters adjacent to the specific character.

The embodiments of the present invention as explained above can be implemented in a form of executable program command through a variety of computer means recordable to computer readable media. The computer readable media may include solely or in combination, program commands, data files, and data configurations. The program commands recorded to the media may be components specially designed for the present invention or may be usable to a skilled person in a field of computer software or the related. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for learning one or more parameters of a Convolutional Neural Networks (CNN) used to recognize one or more characters included in a text in a scene text image of training set, comprising steps of:

a training apparatus, if segmented character images are acquired by dividing an image of the text into separate images of the characters, generating or allowing another device to generate each multidimensional feature vector corresponding to each of the segmented character images;

the training apparatus, on the condition that a specific character image and its neighboring character images are included in the segmented character images, processing or allowing another device to process multidimensional feature vectors $c_{i+j}$ of at least part of the neighboring character images by executing at least one of computations to thereby generate a support vector to be used for recognizing the specific character image, wherein index j is not equal to 0 and $-m \leq j \leq n$, and wherein m and n are positive integers;

the training apparatus obtaining or allowing another device to obtain a merged vector or its processed value by executing a computation with the support vector and a multidimensional feature vector $c_i$ of the specific character image;

the training apparatus (i) determining or allowing another device to determine that the specific character image is a specific letter included in a predetermined set of letters by referring to the merged vector or its processed value; and (ii) adjusting or allowing another device to adjust the parameters by referring to a result of the classification.

2. The method of claim 1, wherein the training apparatus adjusts or allows another device to adjust the parameters by referring to difference information acquired by comparing a value of a ground truth output and the result of the classification.

3. The method of claim 1, before the step of generating or allowing another device to generate each multidimensional feature vector corresponding to each of the segmented character images, further comprising a step of: the training apparatus, if the scene text image is inputted, detecting and extracting or allowing another device to detect and extract the image of the text from the scene text image, and segmenting or allowing another device to segment the image of the text.

4. The method of claim 1, wherein, at the step of processing or allowing another device to process the multidimensional feature vectors $c_{i+j}$ of at least part of the neighboring character images, the computations include a projection operation for acquiring a projected vector by utilizing the multidimensional feature vectors $c_{i+j}$ of at least part of the neighboring character images, and a transformation operation for acquiring the support vector by applying at least one of normalization process or scale process.

5. The method of claim 4, wherein the projection operation includes an operation of multiplying each weighted value to elements in each of the multidimensional feature vectors $c_{i+j}$ and an operation of averaging the elements element-wisely across the multidimensional feature vectors $c_{i+j}$.

6. The method of claim 5, wherein the weighted value is set differently for each of the multidimensional feature vectors $c_{i+j}$.

7. The method of claim 5, wherein the weighted value is set to be higher as a distance value between a location of a certain neighboring character image selected from the neighboring character images and that of the specific character image becomes smaller.

8. The method of claim 1, wherein, at the step of determining or allowing another device to determine that the specific character image is the specific letter included in the predetermined set of letters, the parameters are adjusted by performing a backpropagation training technique.

9. A method for recognizing one or more characters for testing included in a text for testing in a scene text image of testing set, comprising steps of:

(a) a testing apparatus generating or allowing another device to generate each multidimensional feature vector for testing corresponding to each of segmented character images for testing if the segmented character images are acquired by dividing an image of the text for testing into separate images of the characters for testing, on the condition that (i) a first process of generating each multidimensional feature vector for training corresponding to each of segmented character images for training if the segmented character images for training are acquired by dividing an image of a text for training into separate images of characters included in the text for training; (ii) a second process of processing multidimensional feature vectors $c_{i+j}$ for training of at least part of neighboring character images for training by executing at least one of computations to thereby generate a support vector for training to be used for recognizing a specific character image for training, wherein the specific character image for training and its neighboring character images for training are included in the segmented character images for training, wherein index j is not equal to 0 and $-m \leq j \leq n$, and wherein m and n are positive integers; (iii) a third process of obtaining a merged vector for training of the specific character image for training or its processed value by executing a computation with the support vector for training and a multidimensional feature vector $c_i$ for training of the specific character image for training; and (iv) a fourth process of determining that the specific character image for training is a specific letter included in a predetermined set of letters by referring to the merged vector for training or its processed value, and adjusting one or more parameters by referring to a result of the classification have been executed;

(b) the testing apparatus, on the condition that a specific character image for testing and its neighboring character images for testing are included in the segmented character images for testing, processing or allowing another device to process multidimensional feature vectors $c_{i+j}$ for testing of at least part of the neighboring character images for testing by executing at least one of computations to thereby generate a support vector for testing to be used for recognizing the specific character image for testing, wherein index j is not equal to 0 and $-m \leq j \leq n$;

(c) the testing apparatus obtaining or allowing another device to obtain a merged vector for testing or its processed value by executing a computation with the support vector for testing and a multidimensional feature vector $c_i$ for testing of the specific character image for testing; and (d) the testing apparatus performing a classification or allowing another device to perform a classification of the specific character image for testing as a letter included in a predetermined set of letters by referring to the merged vector for testing or its processed value.

10. A training apparatus for learning one or more parameters of a Convolutional Neural Networks (CNN) used to recognize one or more characters included in a text in a scene text image of training set, comprising:

a communication part for acquiring (i) segmented character images obtained by dividing an image of the text in the scene text image into separate images of the characters, (ii) the image of the text or (iii) the scene text image; and a processor for performing processes of (i) generating or allowing another device to generate each multidimensional feature vector corresponding to each of the segmented character images, (ii) generating or allowing another device to generate a support vector to be used for recognizing a specific character image by executing at least one of computations with multidimensional feature vectors $c_{i+j}$ of one or more neighboring character images, wherein the specific character image and the neighboring character images are included in the segmented character images, wherein index j is not equal to 0 and $-m \leq j \leq n$, and wherein m and n are positive integers; (iii) obtaining or allowing another device to obtain a merged vector or its processed value by executing a computation with the support vector and a multidimensional feature vector $c_i$ of the specific character image; and (iv)(iv-1) determining or allowing another device to determine that the specific character image is a specific letter included in a predetermined set of letters by referring to the merged vector or its processed value, and (iv-2) adjusting or allowing another device to adjust the parameters by referring to a result of the classification.

11. The training apparatus of claim 10, wherein the processor is configured to adjust or to allow another device to adjust the parameters by referring to difference information acquired by comparing a value of a ground truth output and the result of the classification.

12. The training apparatus of claim 10, wherein the processor, before executing the process of (i), is further configured to detect and extract or allow another device to detect and extract the image of the text from the scene text image if the scene text image is acquired, and to segment or allow another device to segment the image of the text.

13. The training apparatus of claim 10, wherein the computations in the process of (ii) include a projection operation for acquiring a projected vector by utilizing the multidimensional feature vectors $c_{i+j}$ of at least part of the neighboring character images, and a transformation operation for acquiring the support vector by applying at least one of normalization process or scale process.

14. The training apparatus of claim 13, wherein the projection operation includes an operation of multiplying each weighted value to elements in each of the multidimensional feature vectors $c_{i+j}$ and an operation of averaging the elements element-wisely across the multidimensional feature vectors $c_{i+j}$.

15. The training apparatus of claim 14, wherein the weighted value is set differently for each of the multidimensional feature vectors $c_{i+j}$.

16. The training apparatus of claim 14, the weighted value is set to be higher as a distance value between a location of a certain neighboring character image selected from the neighboring character images and that of the specific character image becomes smaller.

17. The training apparatus of claim 10, wherein the parameters are adjusted by performing a backpropagation training technique.

18. A testing apparatus for recognizing one or more characters for testing included in a text for testing in a scene text image of testing set, comprising:

a communication part for acquiring (i) segmented character images for testing obtained by dividing an image of the text for testing in the scene text image into separate images of the characters for testing, (ii) the image of the text for testing or (iii) the scene text image, on the condition that (1) a first process of generating each multidimensional feature vector for training corresponding to each of segmented character images for training if the segmented character images for training are acquired by dividing an image of a text for training into separate images of characters included in the text for training; (2) a second process of generating a support vector for training to be used for recognizing a specific character image for training by executing at least one of computations with multidimensional feature vectors $c_{i+j}$ for training of one or more neighboring character images for training, wherein the specific character image for training and the neighboring character images for training are included in the segmented character images for training, wherein index j is not equal to 0 and $-m \leq j \leq n$, and wherein m and n are positive integers; (3) a third process of obtaining a merged vector for training of the specific character image for training or its processed value by executing a computation with the support vector for training and a multidimensional feature vector $c_i$ for training of the specific character image for training; and (4) a fourth process of determining that the specific character image for training is a specific letter included in a predetermined set of letters by referring to the merged vector for training or its processed value, and adjusting one or more parameters by referring to a result of the classification have been executed; and a processor for performing processes of (i) generating or allowing another device to generate each multidimensional feature vector for testing corresponding to each of the segmented character images for testing; (ii) generating or allowing another device to generate a support vector for testing to be used for recognizing a specific character image for testing by executing at least one of computations with multidimensional feature vectors $c_{i+j}$ for testing of one or more neighboring character images for testing, wherein the specific character image for testing and the neighboring character images for testing are included in the segmented character images for testing, and wherein index j is not equal to 0 and $-m \leq j \leq n$; (iii) obtaining or allowing another device to obtain a merged vector for testing or its processed value by executing a computation with the support vector for testing and a multidimensional feature vector $c_i$ for testing of the specific character image for testing; and (iv) classifying or allow another device to classify the specific character image for testing as a letter included in a predetermined set of letters by referring to the merged vector for testing or its processed value.

* * * * *